US008554456B2

(12) United States Patent
Brant et al.

(10) Patent No.: US 8,554,456 B2
(45) Date of Patent: Oct. 8, 2013

(54) INTELLIGENT TRAFFIC CONTROL MESH

(75) Inventors: Charles David Brant, Raleigh, NC (US); Esther Marie Burwell, Durham, NC (US); Robert Lee Orr, Raleigh, NC (US); Douglas Andrew Wood, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 13/176,622

(22) Filed: Jul. 5, 2011

(65) Prior Publication Data

US 2013/0013178 A1 Jan. 10, 2013

(51) Int. Cl.
*G06F 19/00* (2011.01)

(52) U.S. Cl.
USPC .......... 701/117

(58) Field of Classification Search
USPC .......... 701/117, 118, 119, 120; 340/906, 340/907, 909, 910, 911, 919, 918, 917, 933, 340/934, 936
See application file for complete search history.

(56) References Cited

U.S. PATENT DOCUMENTS

| | | | | |
|---|---|---|---|---|
| 3,920,967 | A * | 11/1975 | Martin et al. | 701/118 |
| RE31,044 | E | 9/1982 | McReynolds et al. | 364/437 |
| 4,463,339 | A | 7/1984 | Frick et al. | 340/906 |
| 5,278,554 | A | 1/1994 | Marton | 340/910 |
| 5,617,086 | A | 4/1997 | Klashinsky et al. | 340/907 |
| 6,694,247 | B2 | 2/2004 | Hameleers et al. | 701/117 |
| 6,885,935 | B2 | 4/2005 | MacPhail et al. | 701/117 |
| 2002/0026277 | A1 * | 2/2002 | Kerner et al. | 701/117 |
| 2002/0116118 | A1 | 8/2002 | Stallard et al. | 701/117 |
| 2004/0196162 | A1 | 10/2004 | Brooke | 340/906 |
| 2008/0238720 | A1 | 10/2008 | Lee | 340/909 |

OTHER PUBLICATIONS

"City Automates Traffic Management and Gains Unlimited New Possibilities," Cisco Customer Case Study, Cisco Systems, Inc., 2008, 4 pages.

Gradinescu et al., "Adaptive Traffic Lights using Car-to-Car Communication," IEEE Vehicular Technology Conference, Apr. 2007, 5 pages.

"National Transportation Communications for Intelligent Transportation System Protocol," Wikipedia, Aug. 2010, 6 pages.

"P2P Traffic Control: Wireless Technology Could Reduce Congestion, Accidents," Science Daily, Jan. 8, 2009, 2 pages.

Kun-chan Lan et al., "Experiences in Deploying a Wireless Mesh Network Testbed for Traffic Control," CCR online, Dec. 2007, 3 pages.

Ansari et al., "An Implementation of Traffic Light System Using Multi-hop Ad hoc Networks," 2009 International Conference on Network-Based Information Systems, Aug. 2009.

* cited by examiner

*Primary Examiner* — Mary Cheung
*Assistant Examiner* — Rodney Butler
(74) *Attorney, Agent, or Firm* — Van Leeuwen & Van Leeuwen; Diana R. Gerhardt

(57) ABSTRACT

An approach is provided that gathers observational traffic data at traffic controller nodes. Each of the traffic controller nodes communicates observational traffic data to other traffic controller nodes via a network. The traffic controller nodes negotiate traffic control parameters. The negotiating process receives timing proposals from the other traffic controller nodes included in the related set. The nodes analyze the proposed timings based on the traffic controller's gathered observational traffic data. The traffic controller node prepares responses in response to the analysis. The traffic controller node sends the negotiation responses to the other traffic controller nodes. The traffic controller node also adjusts its traffic control parameters that control the node's cycle times based on the analysis.

17 Claims, 10 Drawing Sheets

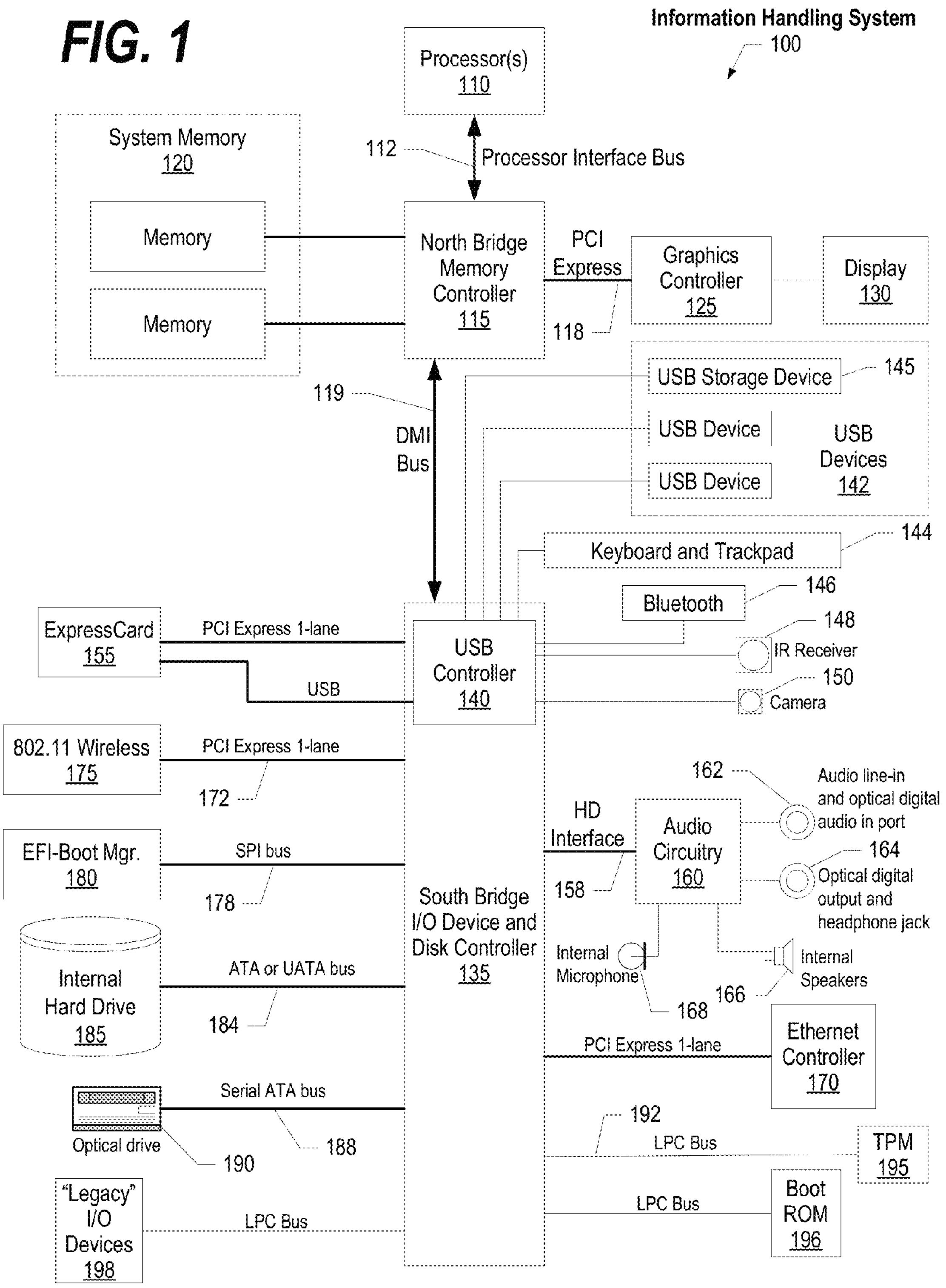

FIG. 1
Information Handling System
100
Processor(s)
110
112
Processor Interface Bus
System Memory
120
Memory
Memory
North Bridge
Memory
Controller
115
PCI
Express
118
Graphics
Controller
125
Display
130
119
DMI
Bus
USB Storage Device
145
USB Device
USB Device
USB
Devices
142
Keyboard and Trackpad
144
Bluetooth
146
148
IR Receiver
150
Camera
ExpressCard
155
PCI Express 1-lane
USB
USB
Controller
140
802.11 Wireless
175
PCI Express 1-lane
172
EFI-Boot Mgr.
180
SPI bus
178
Internal
Hard Drive
185
ATA or UATA bus
184
Optical drive
Serial ATA bus
190
188
"Legacy"
I/O
Devices
198
LPC Bus
South Bridge
I/O Device and
Disk Controller
135
162
Audio line-in
and optical digital
audio in port
HD
Interface
158
Audio
Circuitry
160
164
Optical digital
output and
headphone jack
Internal
Microphone
168
166
Internal
Speakers
PCI Express 1-lane
Ethernet
Controller
170
192
LPC Bus
TPM
195
LPC Bus
Boot
ROM
196

INTELLIGENT TRAFFIC CONTROL MESH

BACKGROUND

The present disclosure relates to an approach that provides a mesh of traffic controllers that communicate with each other to negotiate signal timing in order to packetize traffic with usable gaps between packets.

Traditional traffic control signals, such as traffic lights, are unaware of actual traffic conditions. Some traffic control signals include sensors so that the signal will not unnecessarily cycle if no one is waiting for the signal. These signals can also trigger a cycle event when a vehicle approaches a red (stop) light. However, traditional traffic control signals do not communicate with other traffic control signals based on the traffic on a given route common to the traffic control signals. In addition, traffic passing through traditional traffic control signals often becomes randomly distributed providing few gaps for perpendicular traffic to turn right at a red light. Moreover, traditional traffic control signals cycle signals based on a given cycle period and not based on where natural gaps occur in the traffic.

BRIEF SUMMARY

An approach is provided that gathers observational traffic data at traffic controller nodes. Each of the traffic controller nodes communicates observational traffic data to other traffic controller nodes via a network. The traffic controller nodes negotiate traffic control parameters. The negotiating process receives timing proposals from the other traffic controller nodes included in the related set. The nodes analyze the proposed timings based on the traffic controller's gathered observational traffic data. The traffic controller node prepares responses in response to the analysis. The traffic controller node sends the negotiation responses to the other traffic controller nodes. The traffic controller node also adjusts its traffic control parameters that control the node's cycle times based on the analysis.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein:

FIG. 1 is a block diagram of a data processing system in which the methods described herein can be implemented;

DETAILED DESCRIPTION

Figure 2:
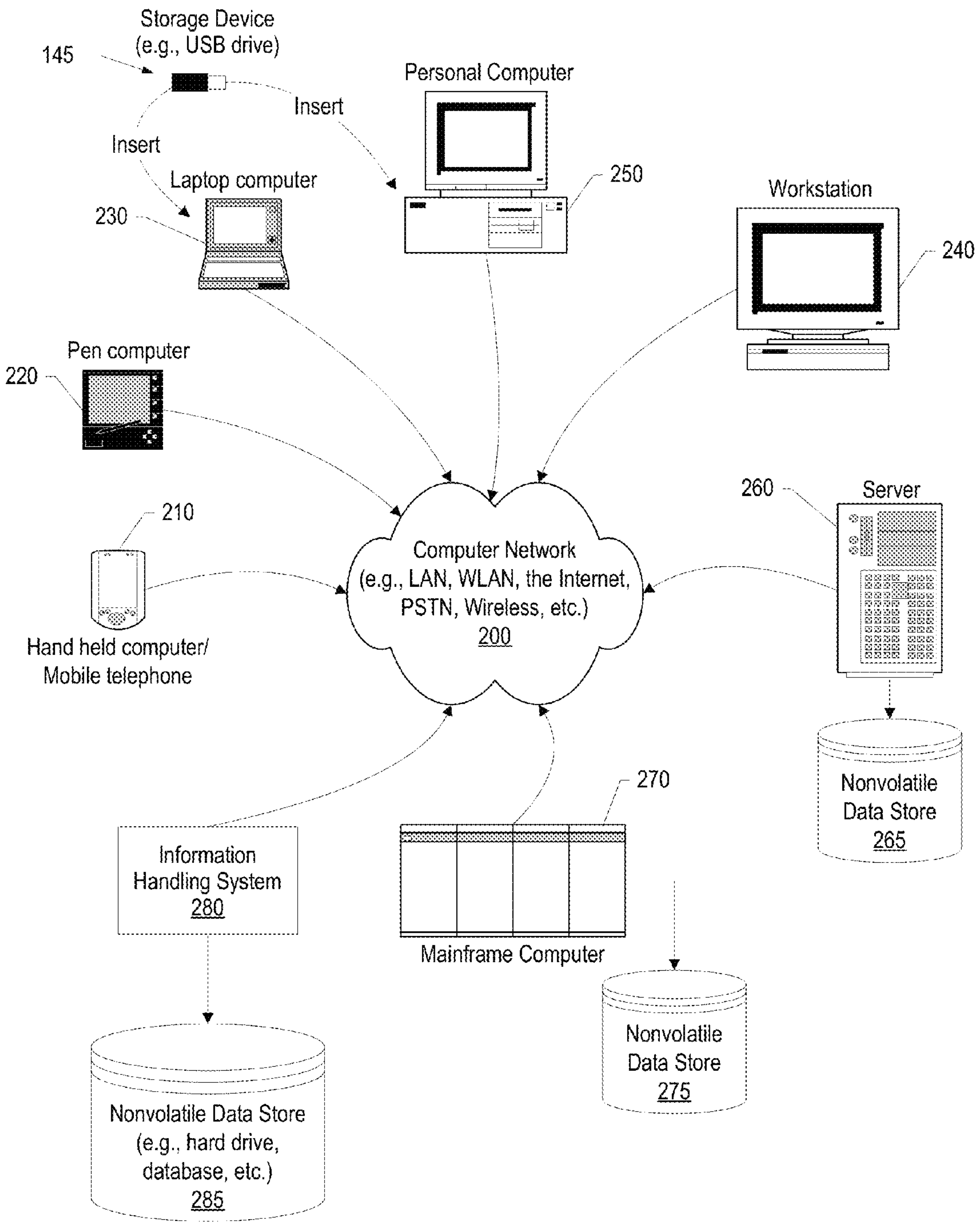
FIG. 2 provides an extension of the information handling system environment shown in FIG. 1 to illustrate that the methods described herein can be performed on a wide variety of information handling systems which operate in a networked environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
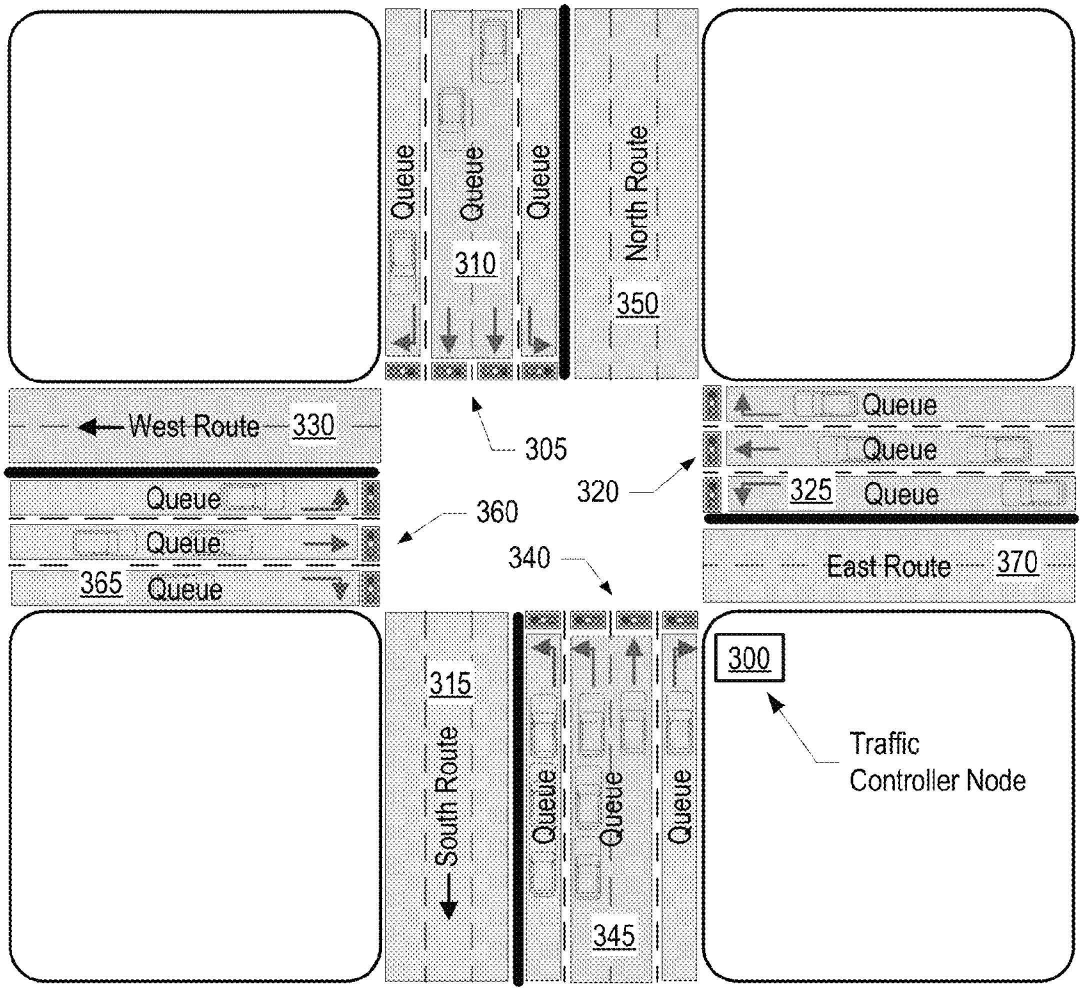
FIG. 3 is a diagram of components at an intersection controlled by a traffic controller node.

FIG. 3 is a diagram of components at an intersection controlled by a traffic controller node. Traffic controller node 300 controls a number of individual traffic signals 305, 320, 340, and 360 using both observational traffic data gathered using sensors that identify the number of vehicles waiting in each of the queues (310, 325, 345, and 365) serviced by the traffic controller node as well as by identifying the number of vehicles in each of the routes (315, 330, 350, and 370) on which traffic travels between signals controlled by the traffic controller node and other signals at other intersections that are controlled by other traffic controller nodes. In addition, the sensors identify the average speed of vehicles along the various routes. Traffic controller node 300 communicates its observational traffic data (number of vehicles, average speeds, etc.) with other traffic controller nodes included in a decentralized traffic control mesh depicted in FIG. 4.

Figure 4:
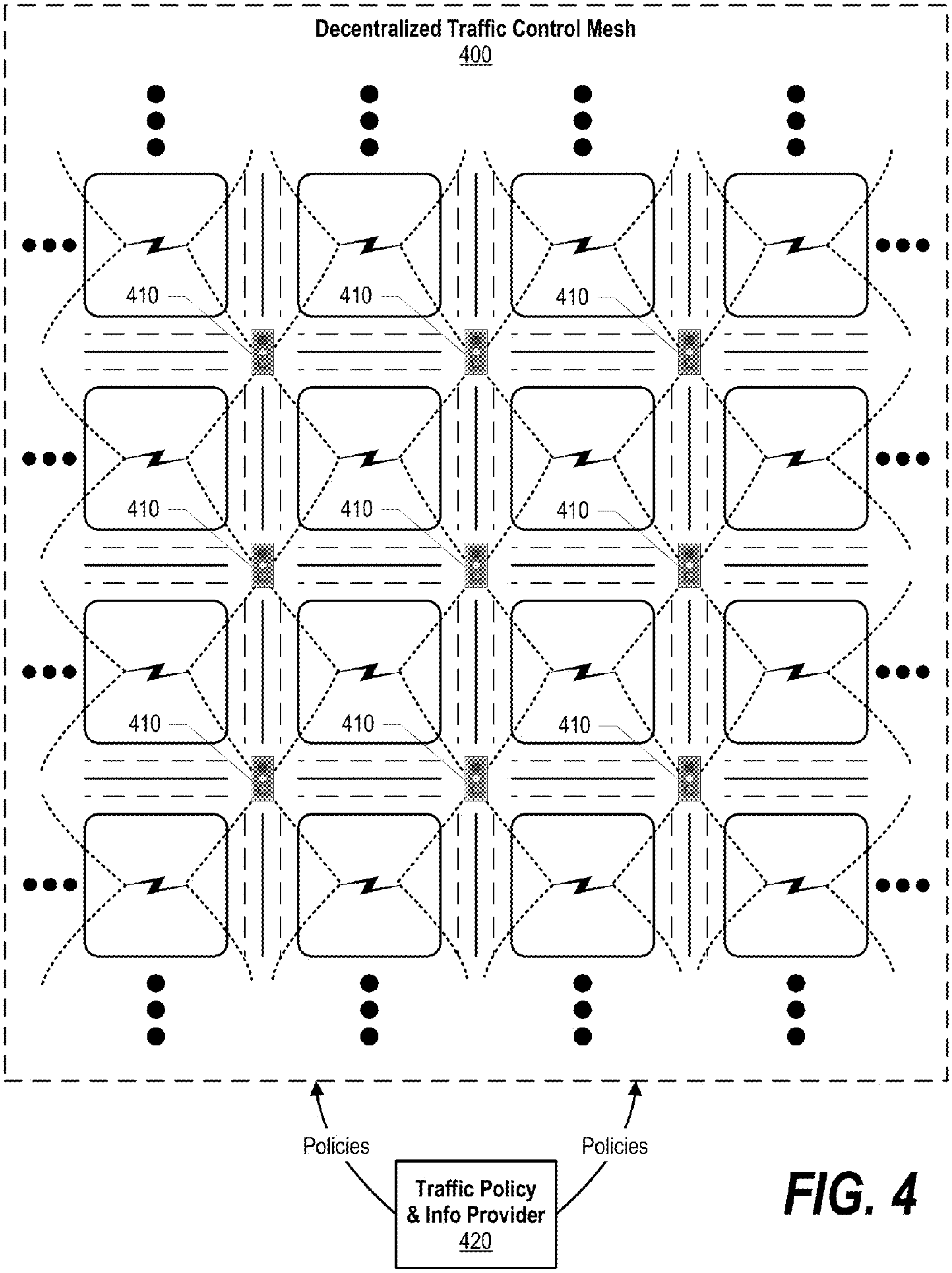
FIG. 4 is a diagram depicting a decentralized traffic control mesh.

FIG. 4 is a diagram depicting a decentralized traffic control mesh. Decentralized traffic control mesh 400 includes a number of intersections 410, each of which is controlled, or managed, by a traffic controller node. Each traffic controller node 410 gathers observational traffic data and communicates the data with other traffic controller nodes included in the decentralized traffic control mesh. The traffic controller nodes negotiate traffic control parameters, such as cycle timing, based on the observational traffic data gathered by the various traffic controller nodes. In addition, traffic policy and information provider 420 provides the various traffic controller nodes with policy and priority information used to prioritize various routes through the decentralized traffic control mesh.

Figure 5:
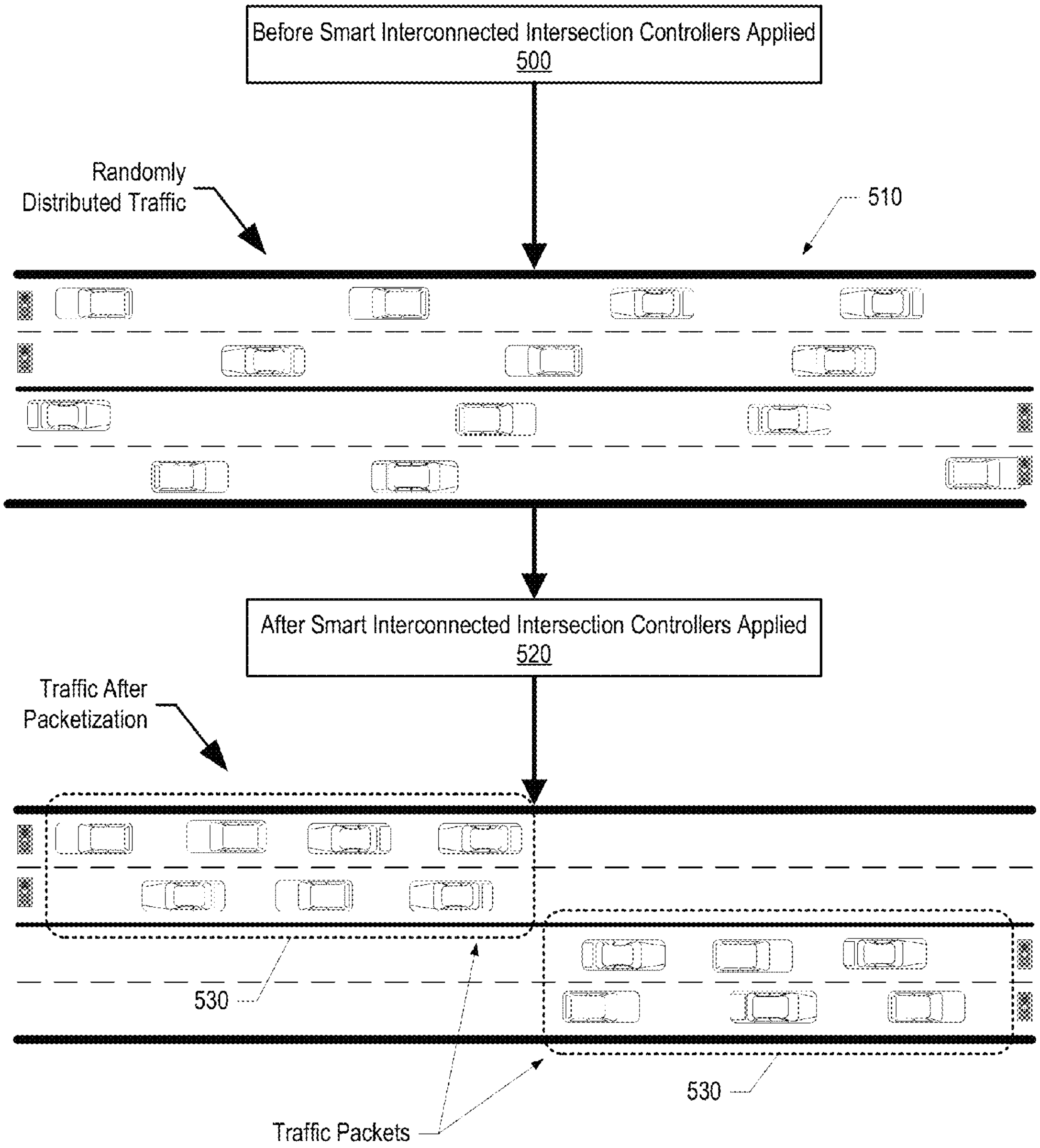
FIG. 5 is a diagram depicting traffic packetization.

FIG. 5 is a diagram depicting traffic packetization. At 500, randomly distributed traffic is depicted on road segment 510 before the traffic is organized into packets by the traffic controller nodes included in the decentralized traffic control mesh that was shown in FIG. 4. At 520, after the traffic controller nodes negotiate traffic control parameters, the traffic controller nodes create vehicle packets 530. Vehicle packets have gaps between packets and the gap locations are synchronized to minimize stoppage by traffic traveling perpendicular (cross traffic) across the decentralized traffic control mesh.

Figure 6:
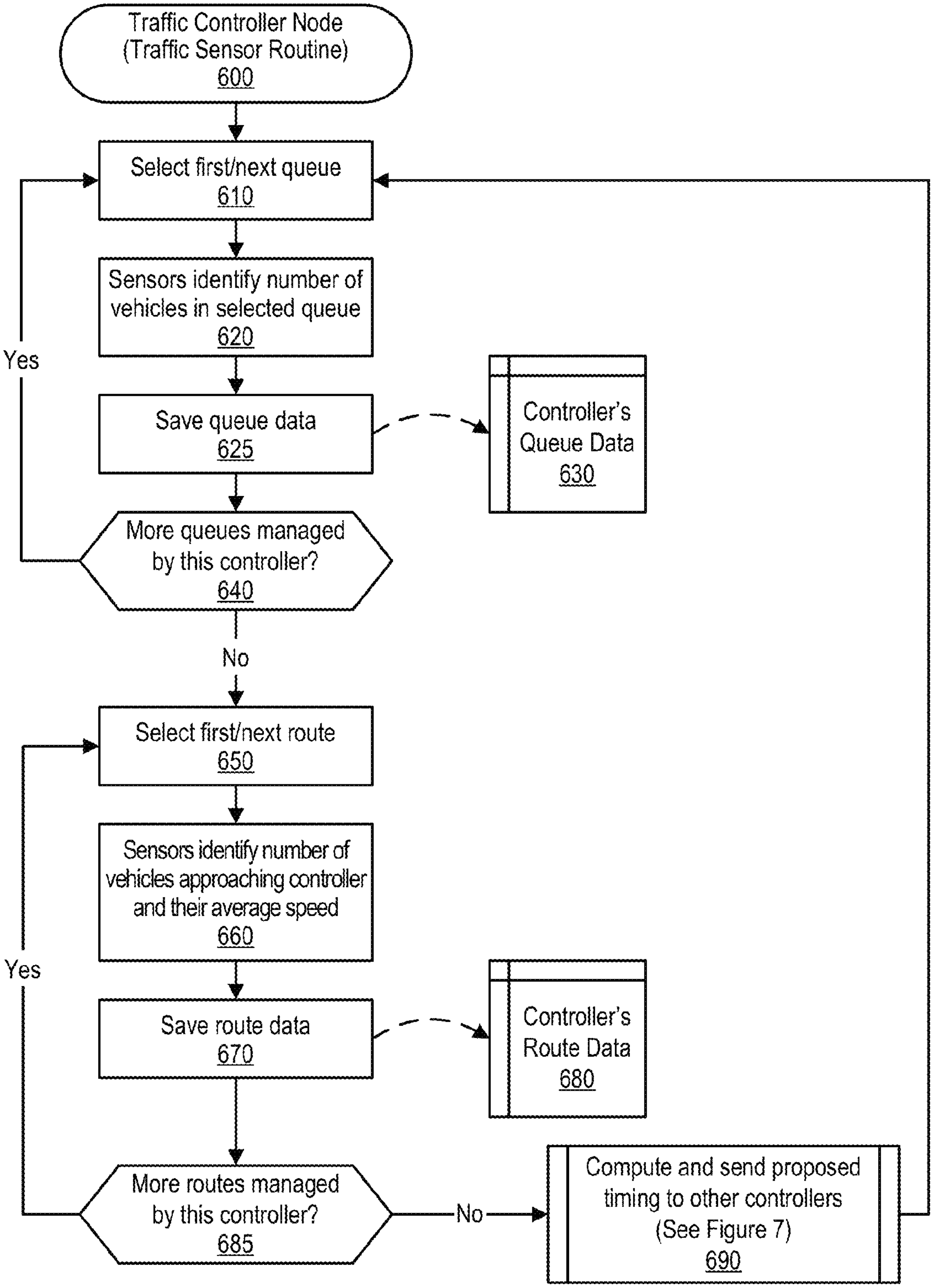
FIG. 6 is a flowchart showing steps taken by a traffic controller node to sense traffic using sensors and create queue data and route data.

FIG. 6 is a flowchart showing steps taken by a traffic controller node to sense traffic using sensors and create queue data and route data. Processing commences at 600 whereupon, at step 610, the traffic controller node selects the first queue that is being managed by the traffic controller node. Vehicles waiting at a light controlled by the traffic controller node are in a queue. At step 620, sensors associated with the traffic controller node identify the number of vehicles waiting in the selected queue. At step 625, the traffic controller node saves the queue data in the traffic controller node's queue data (memory area 630). A decision is made by the traffic controller node as to whether there are any more queues (lights) that the traffic controller node is managing (decision 640). If there are additional queues that the traffic controller node is managing, then decision 640 branches to the "yes" branch which loops back to select and process the next queue as described above. This looping continues until all queues managed by the traffic controller node have been processed and the traffic controller node stores the queue data for each of the queues in memory area 630. When all of the queues managed by the traffic controller node have been processed, then decision 640 branches to the "no" branch to begin processing route data.

Route processing commences at step 650 with the traffic controller node selecting the first route that travels through the signals managed by the traffic controller node. For example, a traffic controller node may be managing a north-bound route, a south-bound route, an east-bound route, and a west-bound route. Routes differ from queues in that traffic in a route is not necessarily stopped (queued) at a red light managed by the traffic controller node. At step 660, the traffic controller node uses its sensors and identifies the number of vehicles approaching a signal controlled by the traffic controller node as well as the average speed of the vehicles. At step 670, the traffic controller node saves this route data (vehicles and average speed) in the traffic controller node's route data (memory area 680). A decision is made by the traffic controller node as to whether there are any more routes that the traffic controller node is managing (decision 685). If there are additional routes that the traffic controller node is managing, then decision 685 branches to the "yes" branch which loops back to select and process the next route as described above. This looping continues until all routes managed by the traffic controller node have been processed and the traffic controller node stores the route data for each of the routes in memory area 680.

Figure 7:
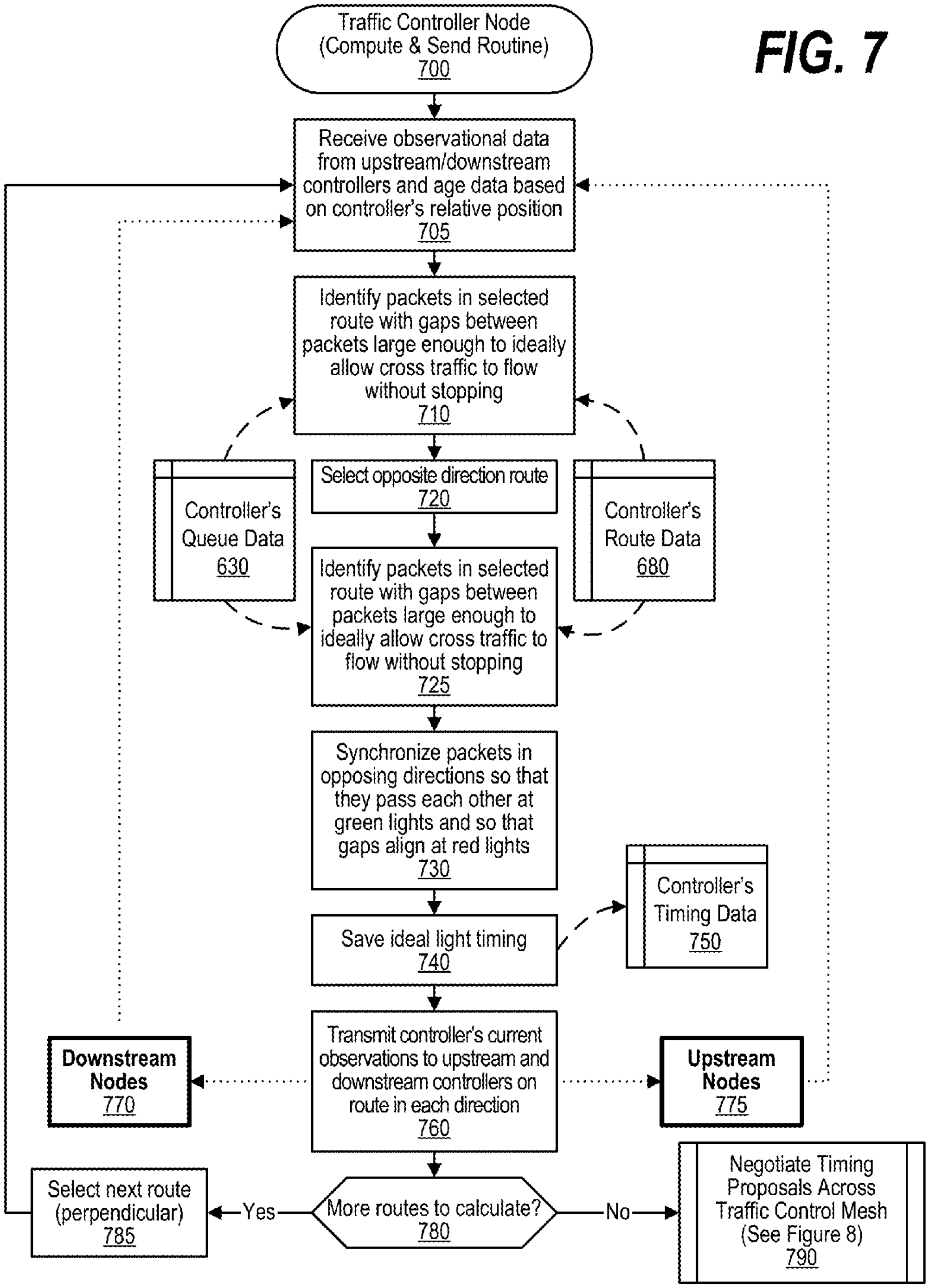
FIG. 7 is a flowchart showing steps taken by a traffic controller node to compute timing data and communicate such data with other nodes.

When all of the routes managed by the traffic controller node have been processed, then decision 685 branches to the "no" branch, whereupon, at predefined process 690, the traffic controller node computes a proposed timing to other controllers (see FIG. 7 and corresponding text for processing details). The processing shown in FIG. 6 repeats as shown in order to provide accurate and updated queue and route data which is used in the computation of proposed timing and the negotiation with other traffic controller nodes.

FIG. 7 is a flowchart showing steps taken by a traffic controller node to compute timing data and communicate such data with other nodes. Processing commences at 700 whereupon, at step 705, the traffic controller node receives observational data (queue sizes, number of vehicles in routes, average speed of vehicles) from other traffic controller nodes (e.g., both upstream and downstream traffic controller nodes). In addition, at step 705, the traffic controller node ages the received data based on the other controllers' relative position from this traffic controller node. At step 710, the traffic controller node identifies packets in a selected route that is managed by the traffic controller node. The traffic controller node identifies packets so that there are gaps between packets that are large enough to ideally (if possible) allow cross traffic to flow without having to stop at a signal that is controlled by the traffic controller node. The traffic controller node uses the received observational data from other traffic controller nodes as well as the traffic controller node's queue data (memory 630) and route data (memory 680) in order to identify these packets.

At step 720, the traffic controller node selects the opposite direction route to the selected route in step 710 (e.g., if a north-bound route was selected in step 710, then the south-bound route is selected at step 720, etc.) At step 725, the traffic controller node identifies packets in the selected route that is managed by the traffic controller node. Again, the traffic controller node identifies packets so that there are gaps between packets that are large enough to ideally (if possible) allow cross traffic to flow without having to stop at a signal that is controlled by the traffic controller node. At step 730, the traffic controller node synchronizes the packet in the opposing direction routes (e.g., the north and south bound routes, etc.) so that (a) the traffic in the opposing direction routes pass each other at the intersection being managed by the traffic controller node and, (b) the gaps in the packets align at red lights so that, ideally, few if any vehicles are waiting at the red light when the perpendicular traffic routes (e.g., the east-west routes, etc.) are passing through the intersection. At step 740, the traffic controller node saves its ideal light timing in the traffic controller node's timing data (memory area 750). At step 760, the traffic controller node transmits its current observations (queue data and route data) to other traffic controller nodes (downstream traffic controller nodes 770 and upstream traffic controller nodes 775) and may also transmit the traffic controller node's ideal timing data to these other traffic controller nodes.

A decision is made as to whether this traffic controller node handles more routes (decision 780). If this traffic controller node handles more routes, then decision 780 branches to the "yes" branch whereupon, at step 785, the traffic controller node selects the next route (e.g., a perpendicular route to the one previously processed, etc.), and processing loops back to calculate timing data and transmit observations as described above. When all of the traffic controller node's routes have been processed, then decision 780 branches to the "no" branch whereupon, at predefined process 790, timing proposals are negotiated across the various traffic controller nodes included in the traffic control mesh (see FIG. 8 and corresponding text for processing details). Note that the processing shown in FIG. 6 repeatedly calls the processing shown in FIG. 7 so that the traffic controller node's ideal timing data is continually adjusted according to current roadway and traffic conditions.

Figure 8:
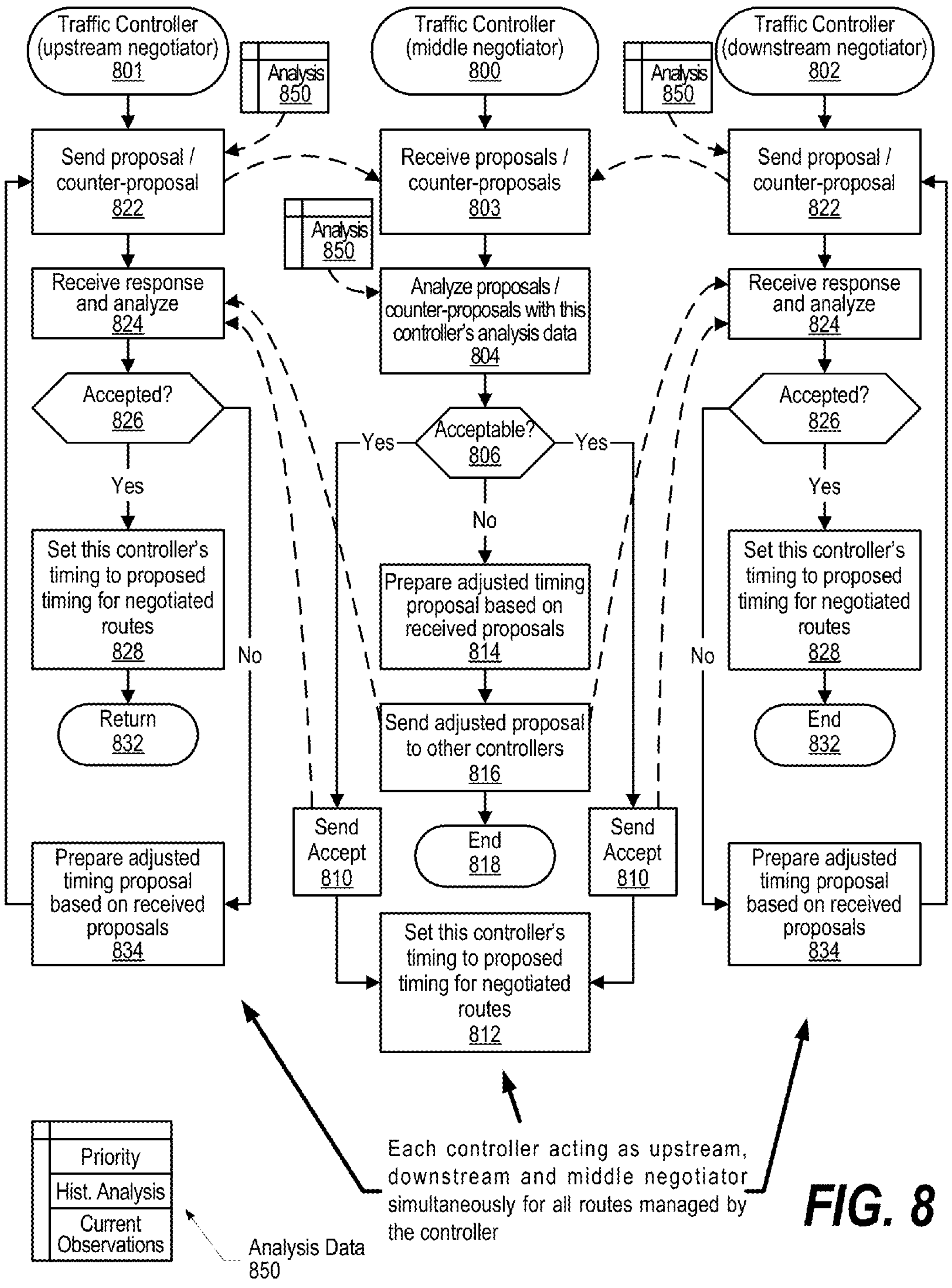
FIG. 8 is a flowchart showing steps taken by traffic controllers in the mesh to negotiate cycle timing between the nodes.

FIG. 8 is a flowchart showing steps taken by traffic controllers in the mesh to negotiate cycle timing between the nodes. Each traffic controller node in the traffic control mesh acts as an upstream negotiator, a middle negotiator, and a downstream negotiator. In addition, a single traffic controller node might be acting as an upstream, middle, and downstream negotiator simultaneously (e.g., with different processors included in the traffic controller node handling the various roles, etc.).

Starting with the middle negotiator, processing commences at 800 whereupon, at step 803, the middle negotiator receives timing proposals and/or counterproposals (collectively, "proposals") from both upstream and downstream traffic controller nodes. At step 804, the middle negotiating traffic controller node analyzes the various proposals using this traffic controller node's analysis data 850. As shown at the bottom of FIG. 8, each controller maintains its own analysis data 850. In one embodiment, analysis data for each traffic controller node includes the traffic controller node's priority (as discussed in FIG. 9 and corresponding text), historical analysis data (as discussed in FIG. 10 and corresponding text), and current observation data (gathered using the process shown in FIG. 6 and corresponding text). In one embodiment, the current observation data for each traffic controller node includes the traffic controller node's queue data from memory area 630 shown in FIG. 6 as well as the traffic controller node's route data from memory area 680, also shown in FIG. 6.

Returning to the processing shown in FIG. 8, a decision is made as to whether the proposal received from an upstream or downstream traffic controller node is acceptable to the middle negotiating traffic controller node (decision 806). If the proposal is acceptable, then decision 806 branches to one of the "yes" branches whereupon, at step 810, an acceptance is returned to the traffic controller node that sent the proposal and, at step 812, the middle negotiating traffic controller node sets its timing data that controls the cycling of the lights at the intersection controlled by the traffic controller node to the agreed-upon timing data. On the other hand, if the proposal is unacceptable to the middle negotiating traffic controller node, then decision 806 branches to the "no" branch whereupon, at step 814, the middle negotiating traffic controller node prepares an adjusted timing proposal that would be acceptable to the middle negotiating traffic controller node and, at step 816, this adjusted proposal (e.g., a counter-proposal) is sent to the upstream and downstream traffic controller nodes for consideration. If multiple proposals were received by the middle negotiating traffic controller node, then each of these proposals is processed as described above. Processing performed by the middle negotiating traffic controller node ends at 818 and is restarted when more proposals are received at the middle negotiating traffic controller node.

Turning now to processing performed by upstream and downstream traffic controller nodes, processing performed by upstream traffic controller nodes is shown commencing at 801 while processing performed by downstream traffic controller nodes is shown commencing at 802. The particular steps performed by upstream/downstream traffic controller nodes are essentially the same, therefore the steps shown are the same for a node negotiating as either an upstream or downstream traffic controller node. Differences between the nodes operating as upstream or downstream are explained with reference to the particular steps discussed below.

At step 822 the traffic controller node (operating as an upstream or downstream node) sends a proposal to the middle negotiating traffic controller node. The proposal is based on the traffic controller node's analysis data which, as previously discussed, includes the traffic controller node's priority (as discussed in FIG. 9 and corresponding text), historical analysis data (as discussed in FIG. 10 and corresponding text), and current observation data (gathered using the process shown in FIG. 6 and corresponding text). Also as previously discussed, in one embodiment the current observation data for each traffic controller node includes the traffic controller node's queue data from memory area 630 shown in FIG. 6 as well as the traffic controller node's route data from memory area 680, also shown in FIG. 6.

Returning to the upstream/downstream processing shown in FIG. 8, at step 824, the upstream/downstream traffic controller node receives a response from the middle negotiating traffic controller node. A decision is made as to whether the middle negotiating traffic controller node has accepted this traffic controller node's proposal that was sent at step 822 (decision 826). If the middle negotiating traffic controller node accepted this traffic controller node's proposal, then decision 826 branches to the "yes" branch whereupon, at step 828, the upstream/downstream traffic controller node sets its timing data that controls the cycling of the lights at the intersection controlled by the traffic controller node to the agreed-upon timing data. Processing performed by the upstream/downstream traffic controller node returns to the calling routine (see FIG. 7, predefined process 790. As the processing shown in FIG. 7 repeats repeatedly, so does the processing shown in FIG. 8 as predefined process 790 is repeatedly called.

Returning to FIG. 8, decision 826, if the proposal is unacceptable to the middle negotiating traffic controller node, then decision 826 branches to the "no" branch whereupon, at step 834, the upstream/downstream negotiating traffic controller node prepares an adjusted timing proposal that would be acceptable to the upstream/downstream negotiating traffic controller node. The proposal by an upstream traffic controller node differs somewhat from that of a downstream traffic controller node in that the upstream traffic controller node is sending traffic to the middle negotiating traffic controller node while the downstream traffic controller node is receiving traffic from the middle traffic controller node. Processing performed by the upstream/downstream traffic controller node loops back to send the adjusted proposal to the middle negotiating traffic controller node.

Figure 9:
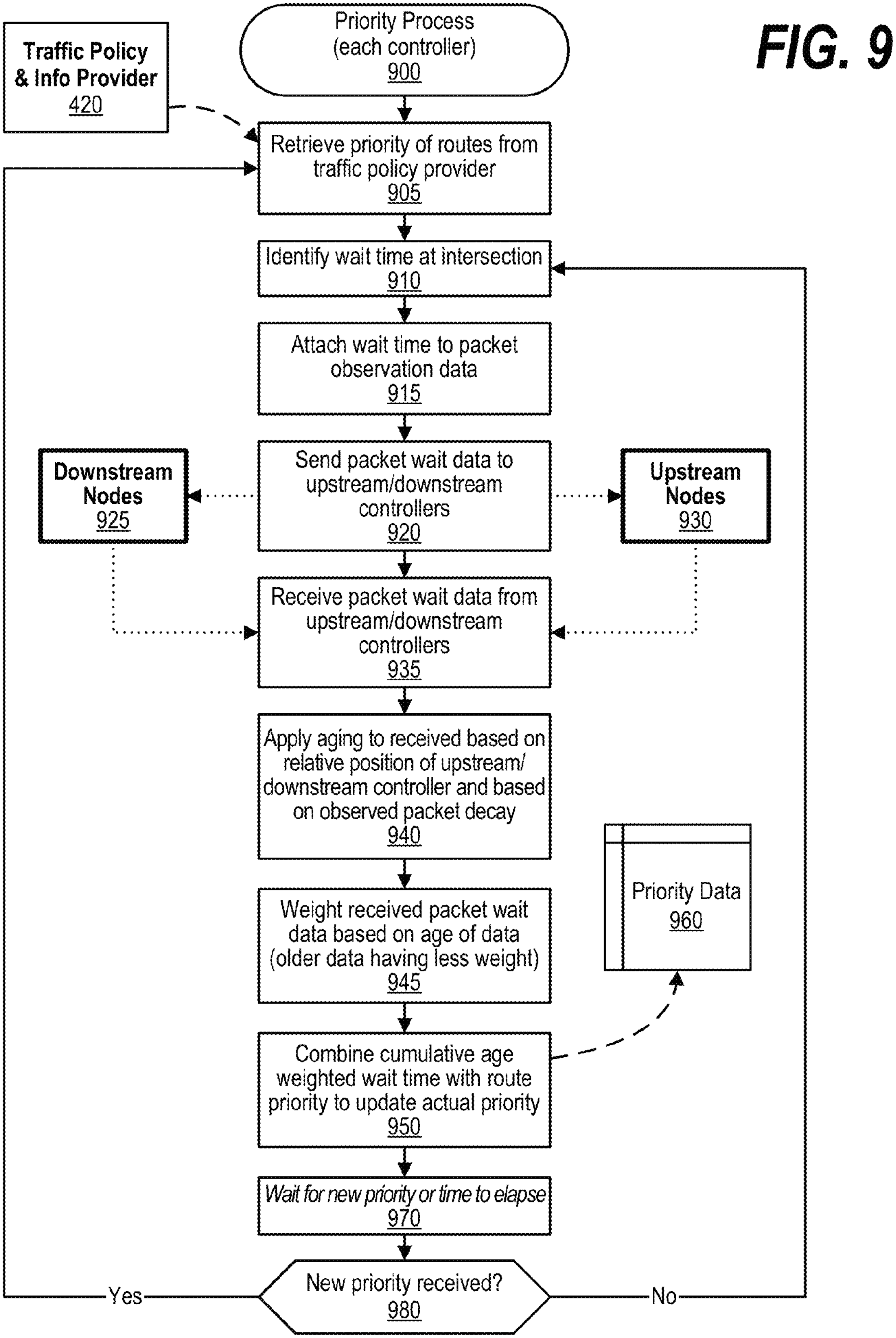
FIG. 9 is a flowchart showing steps taken by a traffic controller node to compute a priority used during negotiations.

FIG. 9 is a flowchart showing steps taken by a traffic controller node to compute a priority used during negotiations. This routine is repeatedly performed by each traffic controller node in order to adjust the traffic controller node's priority value which is a component of the traffic controller node's analysis data (see FIG. 8, analysis data 850). In one embodiment, the priority process is performed independently of the other routines to frequently update the traffic controller node's priority value. In addition, by adjusting the traffic controller node's priority as discussed below, "starvation" of any particular vehicle (or packet of vehicles) can be avoided so that each vehicle receives fair service, subject to route priority policies established by a central traffic policy and information provider 420. This fair service is therefore provided by the individual traffic controller nodes as well as the traffic control mesh as a whole.

Priority processing commences at 900 whereupon, at step 905 the traffic controller node receives an initial or updated priority policy that can increase or decrease priority along various routes. The traffic controller node receives the priority policy from traffic policy and information provider 420. At step 910, the traffic controller node uses its sensors to identify an average vehicle wait time of a packet of vehicles passing through the intersection controlled by the traffic controller node on the various routes. At step 915, this wait time is attached to observational data corresponding to the packet. At step 920, the traffic controller node sends the packet wait data to upstream/downstream traffic controller nodes for the given route (nodes 925 and 930). At step 935, the traffic controller node receives packet wait data from other traffic controller nodes (upstream and downstream) on the given route.

At step 940, the traffic controller node applies an aging factor to the received packet wait data with the aging factor being based on the relative position (upstream, downstream, distance, etc.) of the traffic controller node from which the data was received. At step 945, the traffic controller node applies a weighting factor to the received packet wait data so that data with greater aging factors (older data, e.g., from more distant traffic controller nodes, etc.) is given less weight than data with less aging factors (newer data, e.g., from closer traffic controller nodes, etc.) At step 950, the traffic controller node combines the wait time observed at this traffic controller node with the weighted wait times received from other traffic controller nodes to update the traffic controller node's current priority value (e.g., increase the traffic controller node's priority value, decrease the traffic controller node's priority value, leave the traffic controller node's priority value unchanged, etc.). The traffic controller node stores its priority value in memory area 960.

As shown in FIG. 8, analysis data 850 pertaining to this traffic controller node is comprised of various data including the traffic controller node's current priority value. Returning to FIG. 9, the priority value is stored in memory area 960. At step 970, the traffic controller node waits for either a new priority policy from traffic policy and information provider 420 or for a given time period (e.g., sixty seconds, etc.) to elapse. A decision is made as to whether the traffic controller node has received a new (updated) priority policy from traffic policy and information provider 420 (decision 980). If a new (updated) priority policy was received, then decision 980 branches to the "yes" branch which loops back to step 905 in order to receive the new (updated) priority policy and compute/adjust the traffic controller node's priority value as described above. On the other hand, if the time period elapsed but no new (updated) priority policy was received, then decision 980 branches to step 910 in order to compute/adjust the traffic controller node's priority value also as described above.

Figure 10:
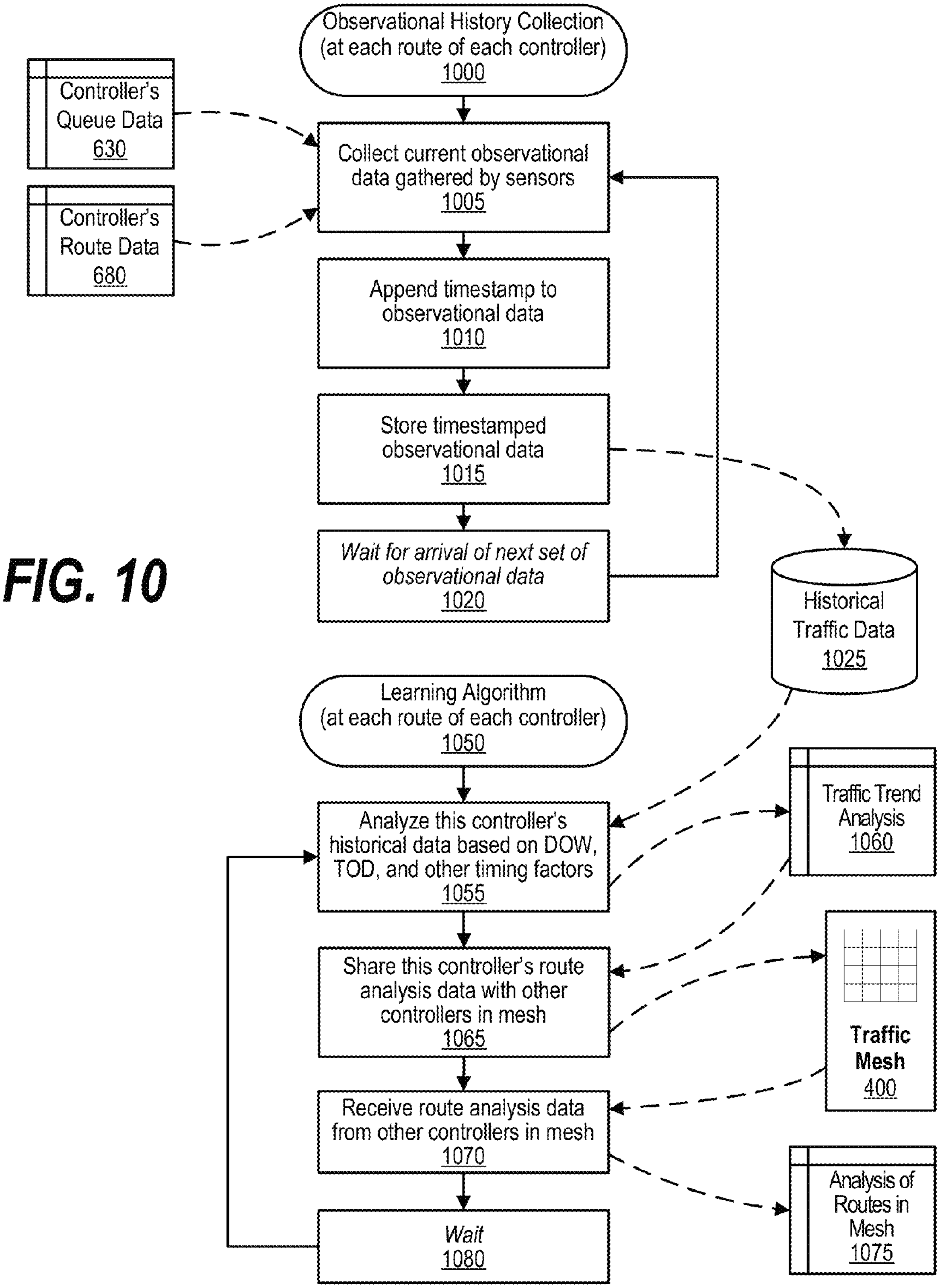
FIG. 10 is a flowchart showing steps taken by a traffic controller node that collects and learns traffic patterns and shares such data with other nodes in the mesh.

FIG. 10 is a flowchart showing steps taken by a traffic controller node that collects and learns traffic patterns and shares such data with other nodes in the mesh. These routines are repeatedly performed by each traffic controller node in order to adjust the traffic controller node's historical analysis data which is a component of the traffic controller node's analysis data (see FIG. 8, analysis data 850). In one embodiment, these routines are performed independently of the other routines in order to periodically update the traffic controller node's historical traffic data. As shown, there is a historical data collection routine (commencing at 1000) as well as a learning algorithm routine (commencing at 1050). The historical collection routine updates the traffic controller node's historical traffic data (data store 1025), while the learning algorithm routine uses the historical traffic data to create a trend analysis which is shared with other traffic controller nodes in the traffic control mesh as well as to receive trend analyses from the other traffic controller nodes in the mesh.

Processing of the historical data collection routine commences at 1000 whereupon, at step 1005, the traffic controller node collects the current observational data (the traffic controller node's queue data from memory area 630 and the traffic controller node's route data from memory area 680) that was identified by the traffic controller node's sensors. At step 1010, the traffic controller node appends a timestamp to the collected observational data. At step 1015, the traffic controller node stores the timestamped observational data in historical traffic data (data store 1025). At step 1020, the traffic controller node waits for the arrival of the next set of observational data. When more observational data arrives, processing loops back to collect and store the data as described above.

Processing of the traffic controller node's learning algorithm routine commences at 1050. This routine performs at the same time as the collection routine described above as the learning algorithm routine uses the historical traffic data gathered by the collection routine. At step 1055, the traffic controller node analyzes its historical traffic data based on timing factors such as the day of the week (DOW), time of day (TOD), etc. This analysis forms the traffic controller node's traffic trend analysis which is stored in memory area 1060. At step 1065, the traffic controller node shares its trend analysis data to other traffic controller nodes included in traffic control mesh 400 and, at step 1070, this traffic controller node receives trend analyses from the other traffic controller nodes included in the traffic control mesh. The collection of trend analyses from the various traffic controller nodes included in the traffic control mesh are used to formulate mesh route analysis 1075 which is an analysis of the various routes managed by the traffic control mesh. At step 1080, the traffic controller node waits for a period of time to elapse or for an update to arrive at historical traffic data (data store 1025), at which time processing loops back to step 1055 to perform the trend analysis processing as described above.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A computer implemented method comprising:

gathering observational traffic data at each of a plurality of traffic controller nodes, wherein each of the traffic controller nodes communicates the gathered observational traffic data with one or more other traffic controller nodes via a network, wherein the observational traffic data includes one or more vehicle packets traveling on one or more routes that are managed by each of the corresponding traffic controller nodes, wherein the vehicle packets are identified based upon gaps between the packets;

negotiating a plurality of traffic control parameters between a selected one of the plurality of traffic controller nodes and a related set of one or more traffic controller nodes, wherein the negotiating further comprises:

receiving a timing proposal from each of the traffic controller nodes included in the related set;

analyzing, by one or more processors, at the selected traffic controller node, the received timing proposals based on the selected traffic controller's gathered observational traffic data;

preparing a plurality of negotiation responses in response to the analysis;

sending the negotiation responses to the traffic controller nodes included in the related set; and adjusting the traffic control parameters that control a current cycle time that corresponds to the selected traffic controller node, wherein the adjusting is based on the analysis.

2. The method of claim 1 wherein the observational traffic data further includes a current queued number of vehicles that are waiting in each of one or more queues that are managed by each of the corresponding traffic controller nodes, a routed number of vehicles that are traveling in each of one or more routes that are managed by each of the corresponding traffic controller nodes, and an average speed of each of the routes that are managed by each of the corresponding traffic controller nodes.

3. The method of claim 2 further comprising:

adjusting, by the selected traffic controller node, a size of each of the gaps, wherein the adjusted gap size is large enough to allow cross traffic to flow at the adjusted gaps;

synchronizing the vehicle packets at the selected traffic controller node traveling in opposite directions;

creating a proposed set of timing data based on the synchronizing; and transmitting the proposed set of timing data to the related set of traffic controller nodes.

4. The method of claim 1 further comprising:

receiving, at the selected traffic controller node, a priority value;

identifying a vehicle wait time from the selected traffic controller node's gathering observational traffic data;

transmitting the identified vehicle wait time to the related set of traffic controller nodes;

receiving one or more packet wait times from the related set of traffic controller nodes;

applying a weight factor to the received packet wait times; and adjusting the priority value based on based on the vehicle wait time and the received packet wait times, wherein the identifying, transmitting, receiving, applying, and adjusting steps are performed repeatedly.

5. The method of claim 4 wherein the analysis of the received timing proposals is also based on the adjusted priority value.

6. The method of claim 1 further comprising:

repeatedly gathering the observational traffic data at the selected traffic controller node, appending a timestamp to each of the observational traffic data gathered at the selected traffic controller node;

storing the gathered observational traffic data with appended timestamps in a historical traffic data store;

analyzing the historical traffic data store based on one or more timing factors resulting in a trend analysis;

transmitting the trend analysis to the related set of traffic controller nodes; and receiving a trend analysis from each of the related set of traffic controller nodes, wherein the analysis of the received timing proposals is also based on the trend analysis and the received trend analyses.

7. An information handling system comprising:

a plurality of traffic controller nodes, wherein each of the traffic controller nodes comprises:

one or more processors;

a memory coupled to at least one of the processors;

one or more traffic sensors accessible by at least one of the processors; and one or more traffic signals controlled by the traffic controller node;

a network that interconnects the plurality of traffic controller nodes; and a program that is executed by each of the plurality of traffic controller nodes, wherein the program includes a set of computer program instructions stored in the memory and executed by at least one of the processors included in each of the plurality of traffic controller nodes in order to perform actions of:

gathering observational traffic data at each of a plurality of traffic controller nodes using the traffic controller node's sensors, wherein the observational traffic data includes one or more vehicle packets traveling on one or more routes that are managed by each of the corresponding traffic controller nodes, wherein the vehicle packets are identified based upon gaps between the packets;

communicating the gathered observational traffic data with one or more other traffic controller nodes via the network;

negotiating a plurality of traffic control parameters between the traffic controller node and a related set of one or more traffic controller nodes, wherein the negotiating further comprises:

receiving a timing proposal from each of the traffic controller nodes included in the related set;

analyzing, at the traffic controller node, the received timing proposals based on the traffic controller's gathered observational traffic data;

preparing a plurality of negotiation responses in response to the analysis;

sending the negotiation responses to the traffic controller nodes included in the related set; and adjusting the traffic control parameters that control a current cycle time that corresponds to traffic signals controlled by the selected traffic controller node, wherein the adjusting is based on the analysis.

8. The information handling system of claim 7 wherein the observational traffic data further includes a current queued number of vehicles that are waiting in each of one or more queues that are managed by each of the corresponding traffic controller nodes, a routed number of vehicles that are traveling in each of one or more routes that are managed by each of the corresponding traffic controller nodes, and an average speed of each of the routes that are managed by each of the corresponding traffic controller nodes.

9. The information handling system of claim 8 wherein at least one of the processors performs additional actions comprising:

adjusting, by the selected traffic controller node, a size of each of the gaps, wherein the adjusted gap size is large enough to allow cross traffic to flow at the adjusted gaps;

synchronizing the vehicle packets at the selected traffic controller node traveling in opposite directions;

creating a proposed set of timing data based on the synchronizing; and transmitting the proposed set of timing data to the related set of traffic controller nodes.

10. The information handling system of claim 7 wherein at least one of the processors performs additional actions comprising:

receiving, at the selected traffic controller node, a priority value;

identifying a vehicle wait time from the selected traffic controller node's gathering observational traffic data;

transmitting the identified vehicle wait time to the related set of traffic controller nodes;

receiving one or more packet wait times from the related set of traffic controller nodes;

applying a weight factor to the received packet wait times; and adjusting the priority value based on based on the vehicle wait time and the received packet wait times, wherein the identifying, transmitting, receiving, applying, and adjusting steps are performed repeatedly.

11. The information handling system of claim 10 wherein the analysis of the received timing proposals is also based on the adjusted priority value.

12. The information handling system of claim 7 wherein at least one of the processors performs additional actions comprising:

repeatedly gathering the observational traffic data at the selected traffic controller node;

appending a timestamp to each of the observational traffic data gathered at the selected traffic controller node;

storing the gathered observational traffic data with appended timestamps in a historical traffic data store;

analyzing the historical traffic data store based on one or more timing factors resulting in a trend analysis;

transmitting the trend analysis to the related set of traffic controller nodes; and receiving a trend analysis from each of the related set of traffic controller nodes, wherein the analysis of the received timing proposals is also based on the trend analysis and the received trend analyses.

13. A computer program product stored in a computer readable storage medium, comprising computer program code that, when executed by an information handling system, causes the information handling system to perform actions comprising:

gathering observational traffic data at each of a plurality of traffic controller nodes, wherein each of the traffic controller nodes communicates the gathered observational traffic data with one or more other traffic controller nodes via a network, wherein the observational traffic data includes one or more vehicle packets traveling on one or more routes that are managed by each of the corresponding traffic controller nodes, wherein the vehicle packets are identified based upon gaps between the packets;

negotiating a plurality of traffic control parameters between a selected one of the plurality of traffic controller nodes and a related set of one or more traffic controller nodes, wherein the negotiating further comprises:

receiving a timing proposal from each of the traffic controller nodes included in the related set;

analyzing, at the selected traffic controller node, the received timing proposals based on the selected traffic controller's gathered observational traffic data;

preparing a plurality of negotiation responses in response to the analysis;

sending the negotiation responses to the traffic controller nodes included in the related set; and adjusting the traffic control parameters that control a current cycle time that corresponds to the selected traffic controller node, wherein the adjusting is based on the analysis.

14. The computer program product of claim 13 wherein the observational traffic data further includes a current queued number of vehicles that are waiting in each of one or more queues that are managed by each of the corresponding traffic controller nodes, a routed number of vehicles that are traveling in each of one or more routes that are managed by each of the corresponding traffic controller nodes, and an average speed of each of the routes that are managed by each of the corresponding traffic controller nodes.

15. The computer program product of claim 14 further comprising additional computer program code that, when executed by the information handling system, causes the information handling system to perform additional actions comprising:

adjusting, by the selected traffic controller node, a size of each of the gaps, wherein the adjusted gap size is large enough to allow cross traffic to flow at the adjusted gaps;

synchronizing the vehicle packets at the selected traffic controller node traveling in opposite directions;

creating a proposed set of timing data based on the synchronizing; and transmitting the proposed set of timing data to the related set of traffic controller nodes.

16. The computer program product of claim 13 wherein the analysis of the received timing proposals is also based on the adjusted priority value and further comprising additional computer program code that, when executed by the information handling system, causes the information handling system to perform additional actions comprising:

receiving, at the selected traffic controller node, a priority value;

identifying a vehicle wait time from the selected traffic controller node's gathering observational traffic data;

transmitting the identified vehicle wait time to the related set of traffic controller nodes;

receiving one or more packet wait times from the related set of traffic controller nodes;

applying a weight factor to the received packet wait times; and adjusting the priority value based on based on the vehicle wait time and the received packet wait times, wherein the identifying, transmitting, receiving, applying, and adjusting steps are performed repeatedly.

17. The computer program product of claim 13 further comprising additional computer program code that, when executed by the information handling system, causes the information handling system to perform additional actions comprising:

repeatedly gathering the observational traffic data at the selected traffic controller node;

appending a timestamp to each of the observational traffic data gathered at the selected traffic controller node;

storing the gathered observational traffic data with appended timestamps in a historical traffic data store;

analyzing the historical traffic data store based on one or more timing factors resulting in a trend analysis;

transmitting the trend analysis to the related set of traffic controller nodes; and receiving a trend analysis from each of the related set of traffic controller nodes, wherein the analysis of the received timing proposals is also based on the trend analysis and the received trend analyses.

* * * * *